United States Patent
Kuhnke

[11] Patent Number: 6,164,611
[45] Date of Patent: Dec. 26, 2000

[54] QUAD-MOTION DEVICE

[75] Inventor: Gerald A. Kuhnke, Plover, Wis.

[73] Assignee: Gamber Johnson, Stevens Point, Wis.

[21] Appl. No.: 09/156,691

[22] Filed: Sep. 18, 1998

Related U.S. Application Data

[60] Provisional application No. 60/059,287, Sep. 18, 1997.

[51] Int. Cl.[7] .................................................. E04G 3/00
[52] U.S. Cl. ................................. 248/279.1; 248/178.1; 248/183.2; 248/187.1
[58] Field of Search ............................. 248/178.1, 179.1, 248/183.1, 183.2, 176.3, 279.1, 180.1, 185.1, 186.2, 285.1, 286.1, 298.1, 920

[56] References Cited

U.S. PATENT DOCUMENTS

| | | | |
|---|---|---|---|
| 1,006,693 | 10/1911 | Shaw | 248/185.1 X |
| 2,251,592 | 8/1941 | Lowe | 248/286.1 |
| 2,481,717 | 9/1949 | Blair | 248/183.2 |
| 2,776,102 | 1/1957 | Schlafly | 248/179.1 |
| 3,592,144 | 7/1971 | Futrell . | |
| 4,103,983 | 8/1978 | Morrison et al. . | |
| 4,341,452 | 7/1982 | Korling | 248/179.1 X |
| 4,437,638 | 3/1984 | Scheibenpflug . | |
| 4,515,086 | 5/1985 | Kwiecinski | 248/920 X |
| 4,562,987 | 1/1986 | Leeds et al. . | |
| 4,687,167 | 8/1987 | Skalka et al. . | |
| 4,733,838 | 3/1988 | van der Lely . | |
| 4,768,744 | 9/1988 | Leeds et al. . | |
| 4,836,486 | 6/1989 | Vossoughi et al. . | |
| 4,844,387 | 7/1989 | Sorgi et al. . | |
| 4,854,538 | 8/1989 | Von Schalscha . | |
| 4,974,808 | 12/1990 | Ball . | |
| 5,119,203 | 6/1992 | Hosaka et al. | 248/179.1 X |
| 5,123,621 | 6/1992 | Gates . | |
| 5,158,253 | 10/1992 | Burghoff et al. . | |
| 5,277,392 | 1/1994 | Rossman et al. . | |
| 5,285,938 | 2/1994 | Fauchald | 248/279.1 X |
| 5,429,332 | 7/1995 | Ishikawa | 248/187.1 |
| 5,443,237 | 8/1995 | Stadtmauer | 248/279.1 X |
| 5,481,817 | 1/1996 | Parker | 248/286.1 |
| 5,485,793 | 1/1996 | Crowell . | |
| 5,501,420 | 3/1996 | Watt et al. . | |
| 5,553,820 | 9/1996 | Karten et al. . | |
| 5,555,491 | 9/1996 | Tao . | |
| 5,564,668 | 10/1996 | Crowe, II . | |
| 5,569,895 | 10/1996 | Lynch et al. . | |
| 5,611,513 | 3/1997 | Rosen . | |
| 5,632,462 | 5/1997 | Kallas . | |
| 5,673,628 | 10/1997 | Boos . | |

FOREIGN PATENT DOCUMENTS 1.406.564  11/1965  France .

*Primary Examiner*—Anita M. King
*Attorney, Agent, or Firm*—Oblon, Spivak, McClelland, Maier & Neustadt, P.C.

[57] ABSTRACT

A multiple motion mounting device permits mounting of an object on a base, the device including a mounting plate having an elongated opening therein and a tilt mechanism slidably mounted on the mounting plate, the tilt mechanism being tiltable with respect to the mounting plate and being pivotable about an axis which passes through the elongated opening. The tilt mechanism may include a slide mechanism and a clevis mounted on the slide mechanism. The mounting plate is pivotally mounted on the base. A method of mounting the object on the base is also provided.

23 Claims, 4 Drawing Sheets

QUAD-MOTION DEVICE

This application is based upon provisional Application Ser. No. 60/059,287, filed Sep. 18, 1997, the priority of which is hereby claimed.

BACKGROUND OF THE INVENTION

1. Field of the Invention

A multiple motion mounting device is provided for mounting an object on a base and includes a mounting plate having an elongated opening form therein, a tilt mechanism slidably mounted on the mounting plate, the tilt mechanism being tiltable with respect to the mounting plate and being pivotable about an axis which passes through the elongated opening. A corresponding method of operation of the same is also within the scope of the present invention.

2. Discussion of the Background

Mounting mechanisms for computers, radios and related devices are known, including U.S. Pat. No. 4,103,983 which discloses a slide mount for a citizens band radio or other electronic equipment wherein the slide mount includes a vehicle mounted base and a slide attached to the electronic equipment. U.S. Pat. No. 4,687,67 discloses a multi-position computer support including a base member, an inner swing arm pivotably mounted with an outer swing arm, and a rotatable supporting platform. Also known is U.S. Pat. No. 5,553,820, which discloses an adjustable monitored support arm assembly or the like designed to provide adjustment of the degrees of freedom of a monitor support arm at a reduced manufacture and assembly cost. Furthermore, U.S. Pat. No. 5,632,462 discloses an assembly for mounting a computer or other communications equipment within a vehicle wherein a mounting bracket attached to the vehicle floor holds a pair of adjustable arms and a horizontal position with a piece of electronic communication equipment on one end of the arms.

The above-noted patents are exemplary of the state of the art for devices of this type, the disclosure of which is incorporated herein by reference. It is to be noted, however, that these devices provide only a limited form of motion with respect to a device mounted on the mounting assemblies discussed above and thus often leads to undesired limits as to the adjustability of the equipment on the mounting assembly.

A conventional mounting device is illustrated in FIG. 1 which serves to show a mounting assembly 1 which has a head 2 and a base 4. The head 2 includes a mounting plate 6 upon which a data terminal interface member 8 can be positioned for a mounting of a device such as a computer or radio.

A tilt mechanism 10 is provided which includes a tilt lock 12. Pivot assembly 14 is provided which is secured in the manner illustrated and which includes an upper plastic washer and a lower metal plate so as to pivot about plate 27 attached to an offset plate or inner tubular assembly 26.

The tilt assembly 10 includes a U-shaped frame 16 which is secured to first and second side plates 18, 18 via the tilt lock mechanism 12 which is lockably engaged with a threaded bolt member 13. Frame 16 is also provided with a pair of arcuate openings 17 through which the bolt is insertable such that, upon loosening of bolts 19,19, the side plates 18, 18 are tiltable and which thus serves to tilt mounting plate 6 and the data terminal interface 8. A circular plastic washer is positioned between frame 16 and plate 27 to reduce the friction therebetween when frame 16 is pivoted/rotated with respect to plate 27.

A bolt 22 is shown in FIG. 1 which serves to help secure frame 16 to plate 27 and which is releasably secured with a nut 24. The arcuate openings 29 in plate 27 have threaded bolts (not shown) which pass therethrough to guide pivoting or rotating motion of frame 16 with respect to plate 27. Shown in the lower portion of FIG. 1 is lower base assembly 28 which cooperates with the offset plate or inner tube assembly 26 in the manner illustrated. Also mountable on mounting plate 6 is a rack 30 which includes a cross bar 32, a plurality of side brackets 34 and additional brackets 36 which can be utilized for mounting, for example, a radio. Tilt lock 12 includes a handle which has threaded openings 38 formed therein to engage with the threads provided on bolt 13. By turning tilt lock 12, it is possible to tighten or loosen the engagement of the same with one of the side plates. Upon loosening of the lock 12, it is possible to tilt the side plates 18,18 with respect to the U-shape frame 16.

It is noted, however, that the conventional mechanism shown in FIG. 1 is lacking in the ability to have a further range of motion insofar as such is not slidable with respect to the mounting plate 6 or with respect to the plate 27, which thus limits the range of positions possible with the mounting assemblies shown in FIG. 1.

SUMMARY OF THE INVENTION

It is therefore an object of the present invention to provide a multiple motion mounting device which provides a mechanical interface between a mounting device and a universal or dedicated computer mount, radio mount or similar type of mounting device.

A further object of the present invention is to provide a device which permits four distinct ranges of motions, these being two separate pivot motions, one sliding motion, thus and one tilting motion, thus providing the user (such being either a driver or passenger of a vehicle) with maximum access Lo the mounted equipment.

An additional object of the present invention is to provide a device which provides two pivot points that allow a computer, radio or other form of electronic equipment to rotate about an axis that is perpendicular to the floor of the vehicle with each pivot point providing at least 120° of rotation independently of one another. In this regard, the first pivot point is provided at a point of attachment of the multiple motion device and a vehicle mount mountable to the floor of the vehicle. A second pivot point is located on a sliding member of the device, the sliding member providing at least four inches of linear motion and an axis parallel to the floor of the vehicle and in a direction which is oriented from the front of the vehicle to the rear.

An additional object of the present invention is to provide a tilt mechanism which is mountable to the second pivot point and which provides at least 60° of tilting action to the computer or radio mount about an axis that is parallel to the floor of the vehicle and which runs from the left side of the vehicle to the right side of the vehicle.

An additional object of the present invention is to provide a method of mounting an object on a device which provides the above-noted four distinct ranges of motion.

In view of the foregoing, the present invention has been devised to overcome this deficiency and to thus provide for additional ranges of motion as compared with that provided with the device shown in FIG. 1.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
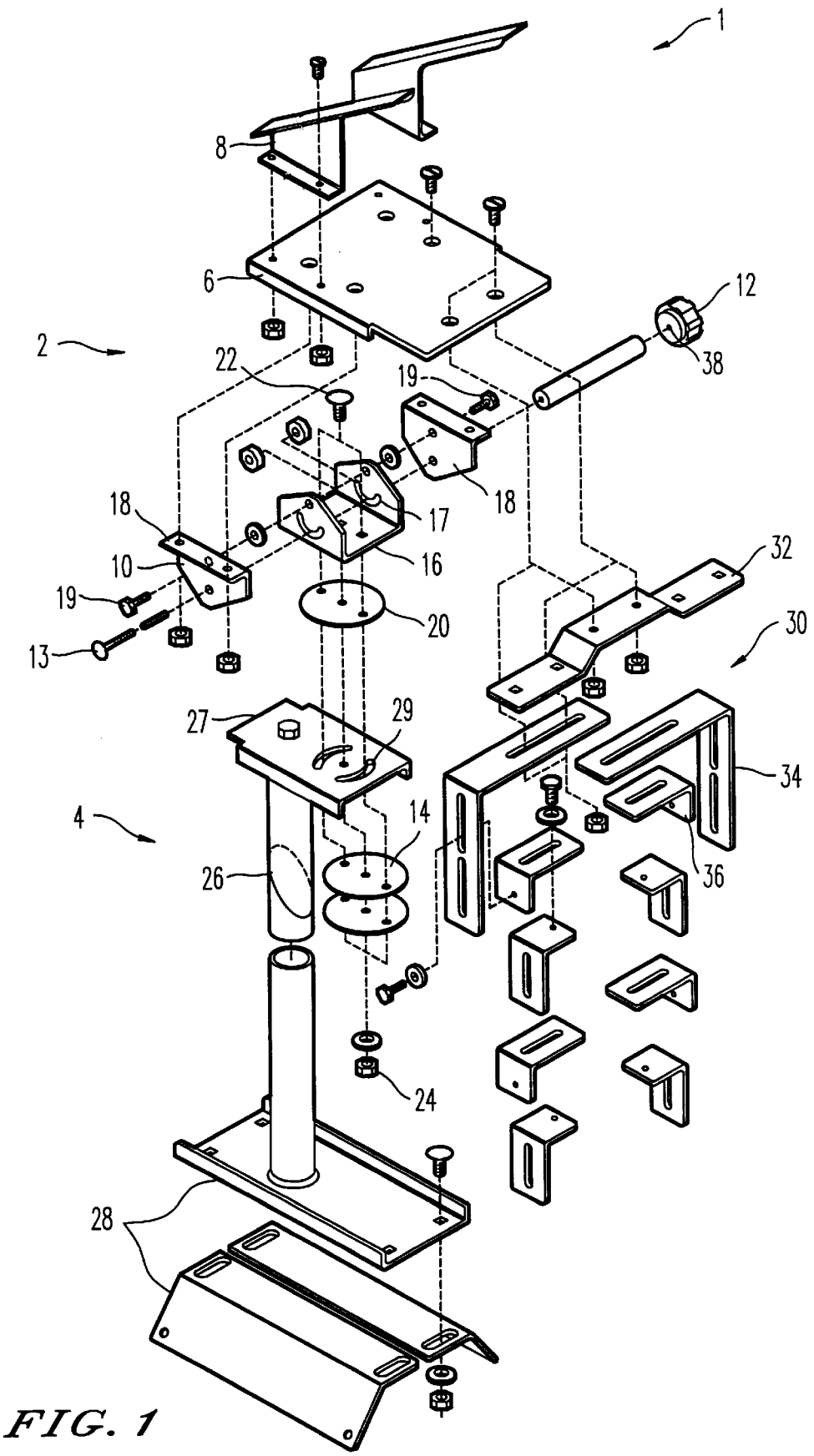
FIG. 1 discloses a conventional mounting mechanism which utilizes a head, base and rack but which permits only pivoting motion of a mounting plate with respect to the base or tilting motion of the mounting plate with respect to the base.

In accordance with the present invention as illustrated in FIGS. 2–5, a multiple motion mounting device 100 is provided which utilizes some of the features of the conventional mechanisms shown in FIG. 1 and is mountable onto a base in the manner illustrated in FIG. 1 but which includes additional structure elements and methods of operation which provide distinct advantages. More particularly, clevis 101 is provided and is pivotably mounted on mounting plate 110. A plurality of threaded bolts 102 are provided which pass through apertures formed in clevis 101 and which are releasably secured by threaded nuts 122. The threaded bolts 102 are mounted on a slidable plate 106 which has a first slidable plastic sheet 109 positioned thereunder that is moveable against an upper surface of a mounting plate 110. The plastic sheet 109 has an opening which cooperates with a projection downwardly extending from slide plate and such projection is guided by grooves or slots 113 formed in plate 110. Plastic sheet 109 provides for a smooth surface to permit easier sliding engagement with mounting plate 110 and which thus permits sliding motion of the clevis 101 and the structure mounted thereto with respect to mounting plate 110. Mounting plate 110 is provided with an elongated opening 112 through which a bolt or screw 104 is positionable with the bolt or screw releasably securing slidable plastic sheet 109 to the lower edge of the mounting plate 110 and which also secures a lower slidable plate 114 against a second plastic sheet 109.

Figure 2:
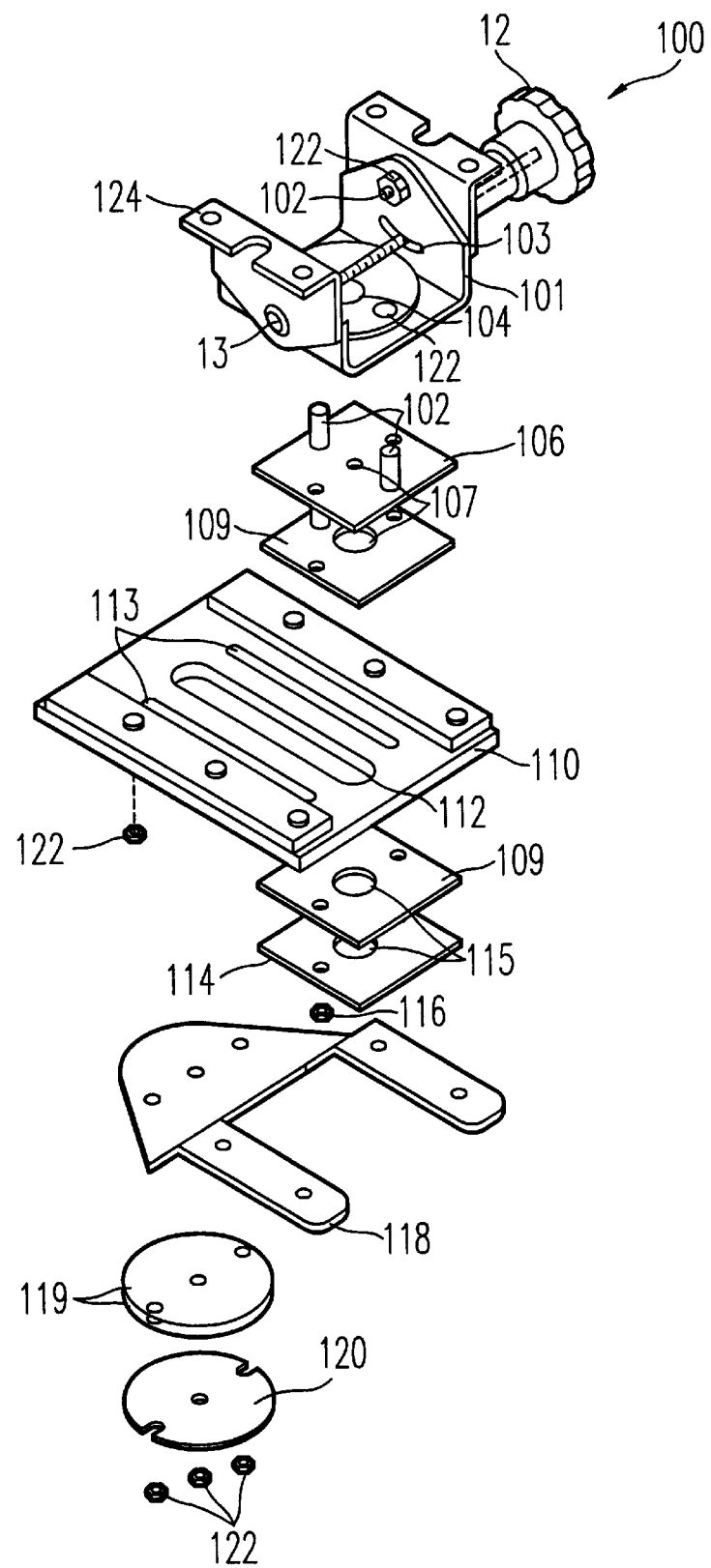
FIG. 2 discloses a preferred embodiment of the present invention, shown in an exploded view and which shows the structure therein which is mountable upon the base shown in FIG. 1.

FIG. 2 also illustrates apertures 115,115 provided in plastic sheet 109 and in lower slidable plate 114 to permit a bolt or screw 104 to pass therethrough and through the apertures 107 formed in slidable plate 106 and in plastic sheet 109 contacting therewith. Bolt or screw 104 is tightened, however, only to the extent that it permits sliding movement of upper plate 106 and lower plate 114 with respect to mounting plate 110.

Mounted to a lower surface portion of mounting plate 110 is a support 118 which is U-shaped and which has one end portion thereof mountable on the base 4 in the manner illustrated in FIG. 1. Support 118 is pivotably mounted with respect to the base due to the utilization of a pair of additional plastic sheets 119, 119, secured against the support 118 by use of a plate 120 and bolt heads 122 which cooperate with bolts slidable through apertures provided at one end portion of the support 118 in the manner illustrated in FIG. 2.

Figure 3:
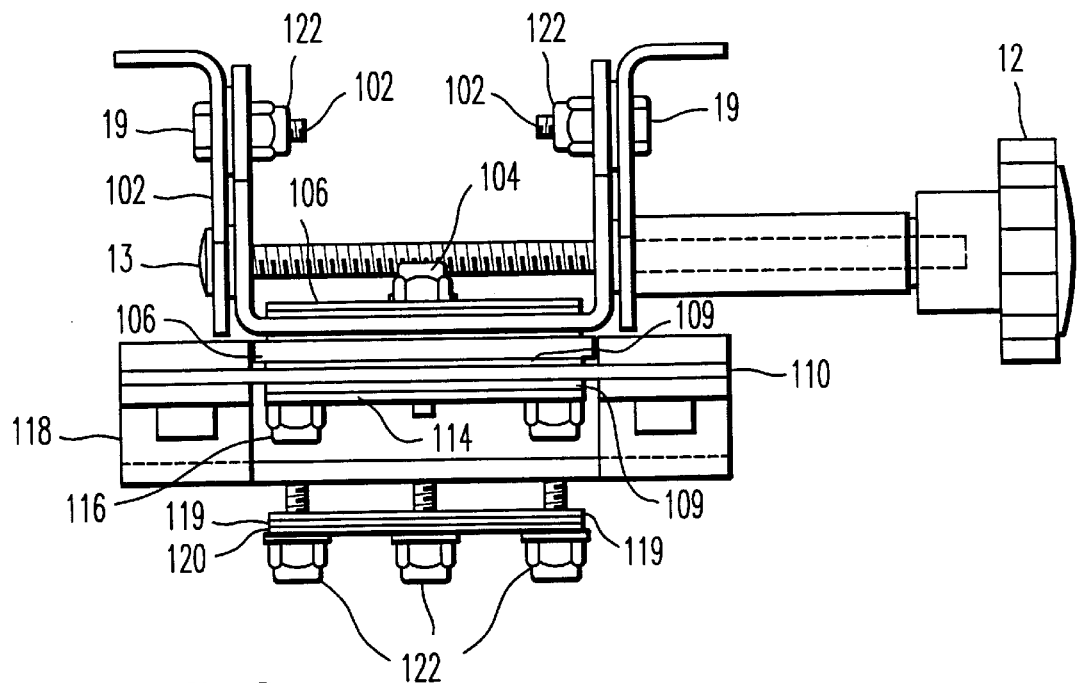
FIG. 3 is a front elevational view of the upper portion of the multiple motion mounting device in accordance with the present invention.
Figure 4:
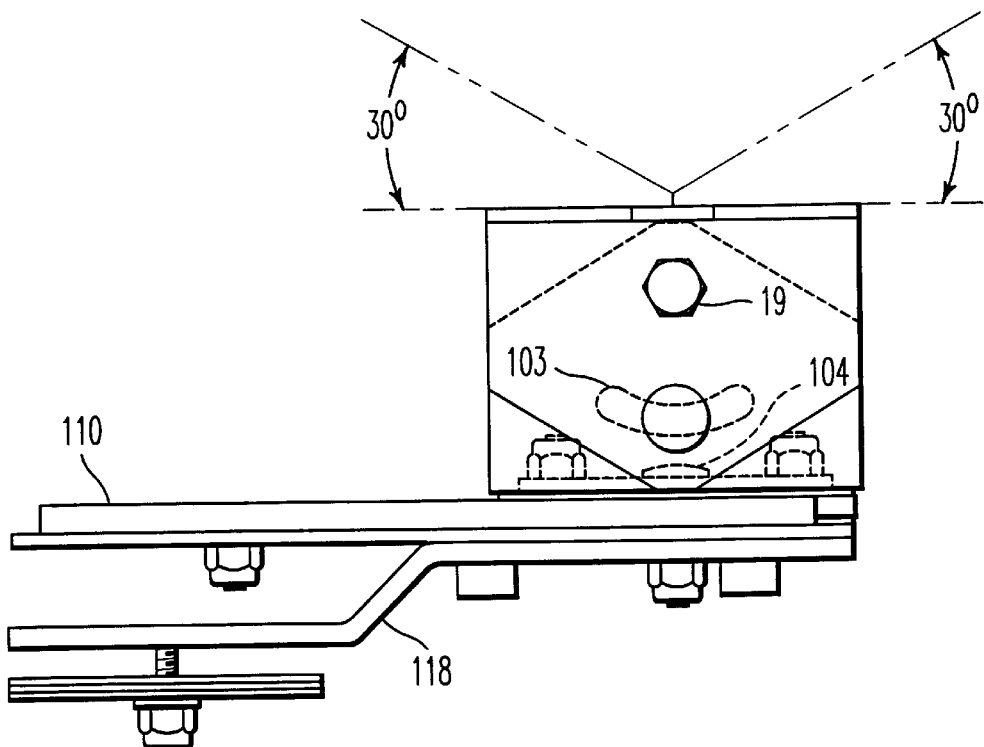
FIG. 4 is a side view of the structure shown in FIG. 3.
Figure 5:
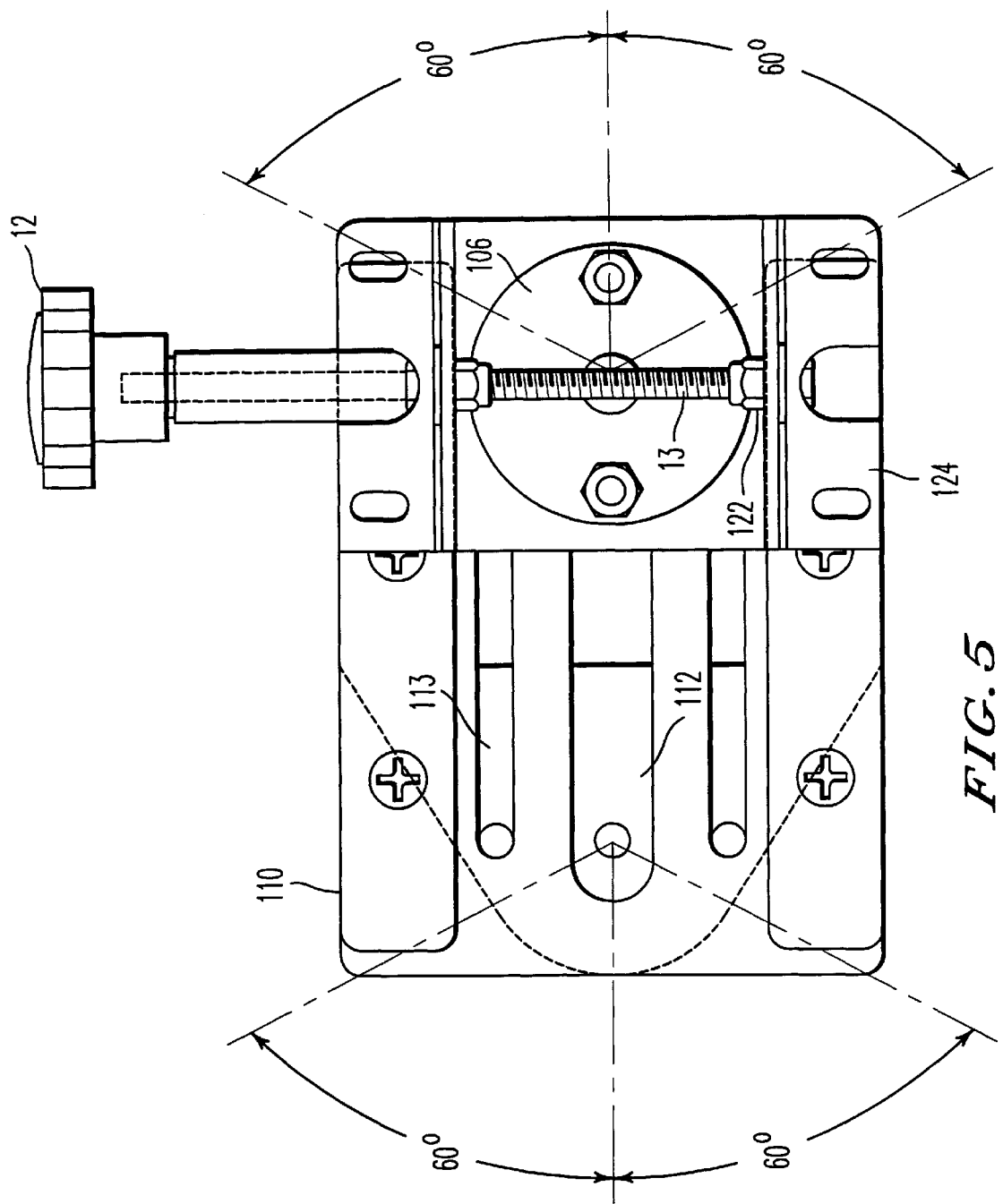
FIG. 5 is a top plan view of the structure shown in FIG. 3 and which shows the ability to provide a pivoting action of up to 120° at either end of the opening formed in the mounting plate or at any point therebetween.

FIGS. 3–5 serve to illustrate the degree of tilting capable with respect to Clevis and which shows that at least a 30° C. angle of tilting is possible on the Clevis in FIG. 4 and that the pivoting motion of the Clevis with respect to the mounting plate 110 through a total angle of 120° is possible at either end of the opening 112 provided in the mounting plate 110. The degree of pivoting possible is variable depending upon the pivoting desired by the operator.

Openings 124 are provided to secure the computer, radio or other device to the mounting device 100.

In view of the foregoing, it can be understood that the multiple motion mounting device in accordance with the present invention is provided for mounting an object on a base and includes a mounting plate having an elongated opening formed therein and a tilt mechanism slidably mounted on the mounting plate, the tilt mechanism being tiltable with respect to the mounting plate being pivotable about an axis which passes through the elongated opening. The tilt mechanism may include a slide mechanism and a clevis 101 mounted on the slide mechanism. The clevis 101 may include a mounting head tiltably secured thereto so that an object is securable to the mounting head.

In addition, a method of mounting an object on the base is provided so as to permit a plurality of motions, which includes the steps of providing the mounting plate which has the elongated opening formed therein, slidably and pivotably mounting the tilt mechanism to the mounting plate such that the tilt mechanism is both slidable in the opening and tiltable with respect to the mounting plate. The method includes the step of pivotably mounting the mounting plate onto the base. The method moreover includes the step of sliding the mounting of the slide mechanism on the mounting plate, mounting the clevis 101 on the slide mechanism and tiltably mounting the mounting head onto the clevis. In addition, the method includes the step of releaseably locking the mounting head onto the clevis so as to adjust the tilting angle of the attachment surface.

The invention is not limited to the embodiment described above. The scope thereof extends to alternative embodiments that would be within the knowledge of one of ordinary skill in the art.

What is claimed is:

1. A multiple motion mounting device for mounting an object on a base column, which comprises:

a support;

a mounting plate having an elongated opening formed therein, said mounting plate being securable to said support; and a slidable plate member slidably mounted on said mounting plate, said slidable plate being pivotable on said mounting plate;

a tilt mechanism slidably mounted on the slidable plate, the tilt mechanism having a portion thereof which is tiltable with respect to the slidable plate and being pivotable by said slidable plate about an axis which passes through said elongated opening, said tilt mechanism including a frame having at least one arcuate opening formed therein, a securing member which is positioned in the arcuate opening and a plate member tiltably secured thereto by said securing member.

2. A multiple motion mounting device as claimed in claim 1, wherein said securing member comprises an adjustable lock mechanism for locking said plate member in position.

3. A device as claimed in claim 1, wherein said slidable plate member includes a plastic sheet member positioned between said plate and said mounting plate so as to assist in pivoting of said slidable plate on said mounting plate.

4. A method of mounting an object on a base so as to permit a plurality of motions, which comprises:

providing a support, a slidable plate, a mounting plate which has an elongated opening formed therein and a securing member;

providing a tilt mechanism with a frame having at least one arcuate opening formed therein and attaching a plate member to said at least one arcuate opening by placing said securing member therein to secure the plate member to the frame; and mounting said mounting plate to said support;

mounting said tilt mechanism to said slidable plate and slidably and pivotally mounting said slidable plate to said mounting plate such that said tilt mechanism and slidable plate are both slidable in said opening and said tilt mechanism is tiltable with respect to said mounting plate.

5. A method as claimed in claim 4, which comprises pivotally mounting said mounting plate onto said base.

6. A method as claimed in claim 4, wherein said tilt mechanism includes a slide mechanism, a clevis and a mounting head and which comprises slidably mounting said slide mechanism on said mounting plate, mounting said clevis on said slide mechanism and tiltably mounting said mounting head onto said clevis.

7. A method as claimed in claim 6, which comprises pivotally mounting said mounting plate onto said base.

8. A method as claimed in claim 6, which comprises releasably locking said mounting head onto said clevis.

9. A method as claimed in claim 8, which comprises pivotally mounting said mounting plate onto said base.

10. A method of mounting an object as claimed in claim 4, which further comprises providing a vertically extending base member and securing said mounting plate to said base member.

11. A method as claimed in claim 4, wherein the placing of the security member comprises placing the lock member into said at least one arcuate opening for adjustably locking the position of the tilt mechanism.

12. A method as claimed in claim 4, which comprises positioning a plastic sheet between said slidable plate and said mounting plate so as to assist in pivoting of said slidable plate on said mounting plate.

13. A multiple motion mounting device for mounting an object on a base column which comprises:

a support;

a mounting plate having an elongated opening formed therein; and tilt means slidably mounted on the mounting plate, said tilt means being tiltable with respect to the mounting plate and being pivotable about an axis which passes through said elongated opening, said tilt means including a frame having at least one arcuate opening formed therein, a securing member which is positioned in the arcuate opening and a plate member tiltably secured thereto by said securing member wherein said mounting device comprises a vertically extending base member, said mounting plate is secured to an upper portion of said support wherein said mounting plate comprises a slidable plate which is pivotably mounted on said base member.

14. A device according to claim 13, wherein said tilt means comprises slide means and a clevis mounted on said slide means.

15. A device according to claim 14, wherein said mounting plate comprises a pivotably mountable plate.

16. A device according to claim 14, wherein said clevis is pivotally mounted on said slide means.

17. A device according to claim 16, which comprises a tiltable mounting head wherein the object is securable to the mounting head.

18. A device according to claim 17, wherein said mounting plate comprises a pivotably mountable plate.

19. A device according to claim 13, wherein said securing member comprises lock means mounted on said tilt means, said lock means locking the position of said tilt means with respect to said mounting plate.

20. A device according to claim 10, which comprises a pivotably mountable support plate means.

21. A multiple motion mounting device as claimed in claim 13, which comprises a vertically extending base column wherein said mounting plate is secured to said vertically extended base column.

22. A device according to claim 13, wherein said securing member comprises a lock member for adjustably locking the tilt means in position.

23. A device as claimed in claim 13, wherein said slidable plate comprises a plastic member positionable between said sliding plate and said mounting plate so as to assist in pivoting of said slidable plate on said member plate.

\* \* \* \* \*

UNITED STATES PATENT AND TRADEMARK OFFICE
CERTIFICATE OF CORRECTION

PATENT NO. : 6,164,611

DATED : December 26, 2000

INVENTOR(S): Gerald A. KUHNKE

It is certified that an error appears in the above-identified patent and that said Letters Patent is hereby corrected as shown below:

On the Title page, the CPA information has been omitted. It should read as follows:

-- [45]  Date of Patent:  *December 26, 2000 --

-- [*]  Notice: This patent issued on a continued prosecution application filed under 37 CFR 1.53(d), and is subject to the twenty year term provisions of 35 U.S.C. 1.54(a)(2)  --

Signed and Sealed this

First Day of May, 2001

Attest:

NICHOLAS P. GODICI

Attesting Officer  Acting Director of the United States Patent and Trademark Office